(12) United States Patent
Aso (10) Patent No.: US 9,783,045 B2
(45) Date of Patent: Oct. 10, 2017

(54) FUEL TANK SYSTEM

(75) Inventor: Shuichi Aso, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 624 days.

(21) Appl. No.: 13/876,676

(22) PCT Filed: Sep. 29, 2010

(86) PCT No.: PCT/JP2010/066990
§ 371 (c)(1),
(2), (4) Date: Apr. 26, 2013

(87) PCT Pub. No.: WO2012/042615
PCT Pub. Date: Apr. 5, 2012

(65) Prior Publication Data
US 2013/0306628 A1    Nov. 21, 2013

(51) Int. Cl.
*B60K 15/03* (2006.01)
*B60K 15/035* (2006.01)

(52) U.S. Cl.
CPC ...... *B60K 15/035* (2013.01); *B60K 15/03177* (2013.01); *B60K 15/03504* (2013.01); *B60K 15/03519* (2013.01); *B60K 2015/0359* (2013.01); *B60K 2015/03571* (2013.01)

(58) Field of Classification Search
CPC ............ B60K 15/035; B60K 15/03177; B60K 15/03504; B60K 15/03519
USPC ....................... 220/4.12, 4.14, 585, 720, 721
See application file for complete search history.

(56) References Cited

U.S. PATENT DOCUMENTS

| | | | | |
|---|---|---|---|---|
| 4,836,409 A | * | 6/1989 | Lane | 220/495.01 |
| 5,099,880 A | * | 3/1992 | Szlaga et al. | 137/587 |
| 5,415,196 A | * | 5/1995 | Bryant et al. | 137/14 |
| 5,606,954 A | * | 3/1997 | Yamazaki et al. | 123/520 |

(Continued)

FOREIGN PATENT DOCUMENTS

| | | |
|---|---|---|
| JP | A-2000-513679 | 10/2000 |
| JP | A-2006-193127 | 7/2006 |

(Continued)

OTHER PUBLICATIONS

Nov. 26, 2013 Office Action issued in Japanese Patent Application No. 2012-536061 (with translation).

*Primary Examiner* — Fenn C Mathew
(74) *Attorney, Agent, or Firm* — Oliff PLC (57) ABSTRACT

A fuel tank system is obtained, in which internal pressure does not readily increase and in which there is no need to secure a space for deformation at the periphery of the fuel tank. A vapor pipe is connected to a fuel tank, and an atmosphere release pipe is connected through a canister. An electromagnetic valve is attached to the vapor pipe, communicating a gas layer at an upper portion inside the fuel tank with the external atmosphere by opening the electromagnetic valve. A thinned deformation location capable of indentation-deformation towards the inside is provided at an upper wall portion of the fuel tank. A negative pressure pump is provided to reduce the pressure inside the fuel tank, causing the deformation location to indentation-deform towards the inside. The fuel tank is sealed by closing the electromagnetic valve in a state in which the deformation location is indentation-deformed towards the inside.

3 Claims, 11 Drawing Sheets

(56) References Cited

U.S. PATENT DOCUMENTS

| | | | | |
|---|---|---|---|---|
| 5,669,361 | A * | 9/1997 | Weissinger et al. | 123/520 |
| 5,687,778 | A * | 11/1997 | Harris | 141/59 |
| 5,868,120 | A * | 2/1999 | Van Wetten et al. | 123/518 |
| 5,964,204 | A * | 10/1999 | Freeland | 123/516 |
| 6,360,729 | B1 * | 3/2002 | Ellsworth | 123/518 |
| 6,681,789 | B1 * | 1/2004 | Moulis et al. | 137/14 |
| 7,527,045 | B2 * | 5/2009 | Chung | 123/519 |
| 7,665,447 | B2 * | 2/2010 | Shinagawa et al. | 123/516 |
| 2006/0162433 | A1 * | 7/2006 | Matsubara et al. | 73/118.1 |
| 2009/0025694 | A1 * | 1/2009 | Shinagawa et al. | 123/519 |
| 2009/0266147 | A1 * | 10/2009 | Maegawa | 73/40.7 |

FOREIGN PATENT DOCUMENTS

| | | |
|---|---|---|
| JP | A-2007-269124 | 10/2007 |
| JP | A-2009-30539 | 2/2009 |
| JP | A-2012-025257 | 2/2012 |

* cited by examiner

FUEL TANK SYSTEM

TECHNICAL FIELD

The present invention relates to a fuel tank system.

BACKGROUND ART

Patent Document 1 below discloses a sealed type fuel tank structure wherein the volume of a fuel tank is increased by resilient deformation of an upper wall portion of the fuel tank bulging out towards a vehicle upper side (tank outside) when the amount of fuel vapor inside the fuel tank increases due for example to a rise in temperature.
Patent Document 1: Japanese Patent Application Laid-Open (JP-A) No. 2009-30539

DISCLOSURE OF INVENTION

Technical Problem

However, the technology disclosed in Patent Document 1 is a structure in which the upper wall portion of the fuel tank bulges out towards the tank outside. There are a large number of air molecules in the fuel tank when sealed, and the partial pressure of the air inside the fuel tank increases readily, increasing the internal pressure of the fuel tank. There is accordingly a need to strengthen the fuel tank itself.

There is also a need to secure a space between the fuel tank and a floor face above the fuel tank to allow the bulging deformation of the upper wall portion of the fuel tank towards the tank outside. There are accordingly limitations to the degrees of freedom for design.

In consideration of the above circumstances, an object of the present invention is to obtain a fuel tank system wherein the internal pressure of a fuel tank does not increase readily due for example to a rise in temperature, and there is no need to secure a space for deformation at the periphery of the fuel tank.

Solution to Problem

A fuel tank system of a first aspect of the present invention includes: a fuel tank capable of storing fuel that is supplied to an engine; a pipe that communicates a gas layer at an upper portion inside the fuel tank with the external atmosphere; a deformation location that is provided at a portion of an upper wall portion of the fuel tank so as to be provided at a periphery of a fuel pump provided at a central portion inside the fuel tank in plan view, and that is capable of deforming so as to indent towards the inside of the fuel tank; a deformation unit that deforms the deformation location such that the deformation location indents towards the inside of the fuel tank; a valve that is provided at the pipe, that opens the pipe to communicate the gas layer with the external atmosphere, and that closes off the pipe to seal the fuel tank; and a control unit that actuates the deformation unit with the valve in an open state after the gas layer has been communicated with the external atmosphere, and that closes the valve in a state in which the deformation location is indented towards the inside of the fuel tank, wherein the deformation unit is a negative pressure pump that lowers the pressure inside the fuel tank by suctioning from the gas layer set so as to drive the negative pressure pump immediately after a lid has been closed after refueling, and wherein configuration is m.ade such that the deformation location returns to its original position on the extension line of the upper wall portion according to the increase in the pressure when the pressure inside the fuel tank increases to a specific value or greater from a state in which the deformation location is indented towards the inside of the fuel tank.

A fuel tank system of a sixth aspect of the present invention is the fuel tank system of the first aspect wherein: a pressure sensor is further included that detects the pressure inside the fuel tank; and the control unit actuates the deformation unit when the pressure detected by the pressure sensor is higher than a stipulated value.

A fuel tank system of a seventh aspect of the present invention is the fuel tank system of the sixth aspect wherein the control unit closes the valve when the pressure detected by the pressure sensor reaches the stipulated value or lower, and then ceases actuation of the deformation unit after the valve has been closed.

According to the fuel tank system of the first aspect of the present invention, the deformation location is provided at a portion of the upper wall portion of the fuel tank capable of storing fuel so as to be provided at the periphery of the fuel pump provided at the central portion inside the fuel tank in plan view. The deformation location is configured so as to be capable of deforming so as to indent towards the inside of the fuel tank. After the gas layer at the upper portion inside the fuel tank has been communicated with the external atmosphere through the pipe, the control unit actuates the deformation unit with the valve provided at the pipe in an open state, thereby deforming the deformation location so as to indent towards the inside of the fuel tank. The number of air molecules in the gas layer inside the fuel tank is accordingly reduced. The control unit then also closes the valve in a state in which the deformation location is indented towards the fuel tank inside, blocking off the pipe and sealing the fuel tank. Namely, even when the temperature rises after sealing the fuel tank, the pressure (internal pressure) inside the fuel tank increases less readily by an amount related to the reduced number of air molecules due to deforming the deformation location so as to indent towards the inside of the fuel tank and reduce the number of air molecules in the gas layer. There is therefore no need to unnecessarily further strengthen the fuel tank, in contrast to cases in which a deformation location is made to bulge outwards from a fuel tank. Moreover, the need to secure a space for deformation at the periphery of the fuel tank is obviated since the deformation location does not bulge outwards from the fuel tank. Moreover, the deformation location is provided at a portion of the upper wall portion of the fuel tank, and so there is no need to secure a deformation region for the deformation location to the upper side of the fuel tank.

Accordingly, the separation between for example a main body disposed to the upper side of the fuel tank and the deformation location can be made small.

Moreover, the deformation unit is the negative pressure pump that lowers the pressure inside the fuel tank by sucking out from the gas layer, causing the deformation location of the wall portion of the fuel tank to deform so as to indent towards the inside of the fuel tank. Setting is made to drive the negative pressure pump immediately after the lid has been closed after refueling. The deformation location can accordingly be made to deform so as to indent towards the inside with a simple configuration.

Moreover, the deformation location gradually bulges in a range to return to its original position on the extension line of the upper wail portion according to the increase in the pressure when the pressure inside the fuel tank increases to a specific value or greater, due for example to a rise in temperature, after the fuel tank has been sealed in a state in which the deformation location is indented towards the fuel tank inside. Namely, pressure fluctuation inside the fuel tank is reduced due to the deformation location deforming according to changes in the pressure inside the fuel tank resulting from changes in temperature. The need to unnecessarily further strengthen the fuel tank is accordingly obviated.

According to the fuel tank system of the sixth aspect of the present invention, the pressure sensor detects the pressure inside the fuel tank, and the control unit actuates the deformation unit when the pressure detected by the pressure sensor is higher than the stipulated value, thereby deforming the deformation location of the fuel tank so as to indent towards the inside of the fuel tank. The deformation unit is accordingly not actuated when the pressure detected by the pressure sensor is the stipulated value or lower, allowing efficient actuation of the deformation unit.

According to the fuel tank system of the seventh aspect of the present invention, the control unit closes the valve when the pressure detected by the pressure sensor reaches the stipulated value or lower, and then ceases actuation of the deformation unit after the valve has been closed. The deformation location of the fuel tank can accordingly be made to indentation-deform more reliably.

Advantageous Effects of Invention

As described above, in the fuel tank system of the first aspect of the present invention, the internal pressure of the fuel tank does not readily increase due for example to a rise in temperature, obviating the need to secure a space for deformation at the periphery of the fuel tank. Moreover, the separation between a main body disposed to the upper side of the fuel tank and the deformation location can be made small.

Moreover, in the fuel tank system according to the first aspect of the present invention, the deformation location of the wall portion of the fuel tank can be made to deform so as to indent towards the inside of the fuel tank with a simple configuration.

Moreover, in the fuel tank system of the first aspect of the present invention, pressure fluctuation inside the fuel tank is reduced, and there is no need to unnecessarily further strengthen the fuel tank.

In the fuel tank system of the sixth aspect of the present invention, the deformation unit can be actuated efficiently according to the pressure inside the fuel tank.

In the fuel tank system of the seventh aspect of the present invention, the deformation location of the fuel tank can be made to indentation-deform more reliably, thereby increasing reliability.

BRIEF DESCRIPTION OF DRAWINGS

FIG. 1-1 is a schematic configuration diagram illustrating a fuel tank system of a first exemplary embodiment of the present invention.

FIG. 1-2 is a cross-section illustrating an example of a fuel tank employed in a fuel tank system of the first exemplary embodiment of the present invention.

FIG. 1-3 is a plan view and a cross-section illustrating a modified example of a fuel tank employed in a fuel tank system of the first exemplary embodiment of the present invention.

FIG. 11 is a partial configuration diagram illustrating a fuel tank system of the comparative example in a state when travel has stopped.

FIG. 12 is a partial configuration diagram illustrating a fuel tank system of the comparative example in a state in which the temperature has fallen when travel has stopped.

FIG. 13 is a partial configuration diagram illustrating a fuel tank system of the comparative example in a state in which the temperature has risen when parked.

BEST MODE FOR CARRYING OUT THE INVENTION

Figure 11:
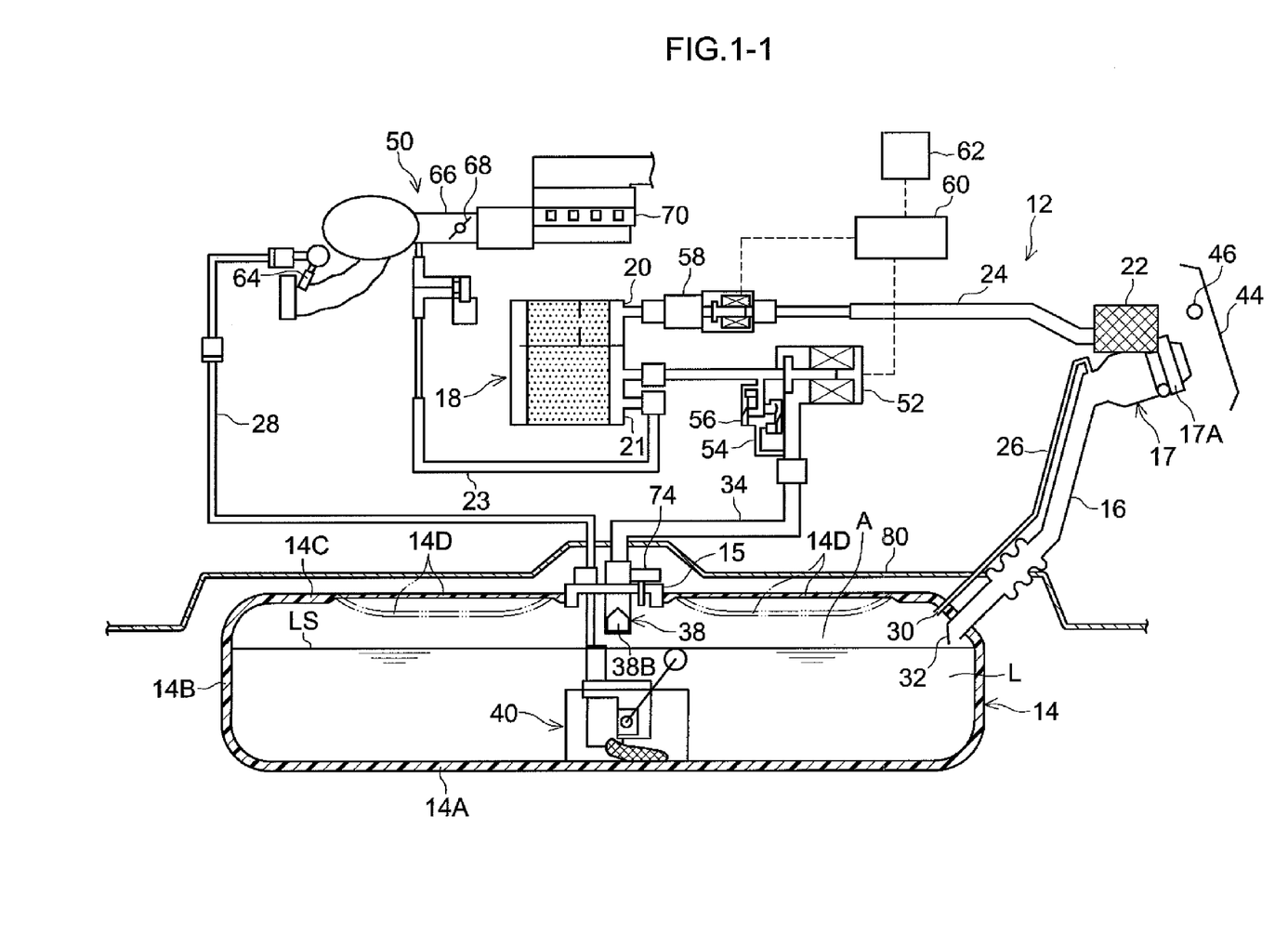
Figure 12:
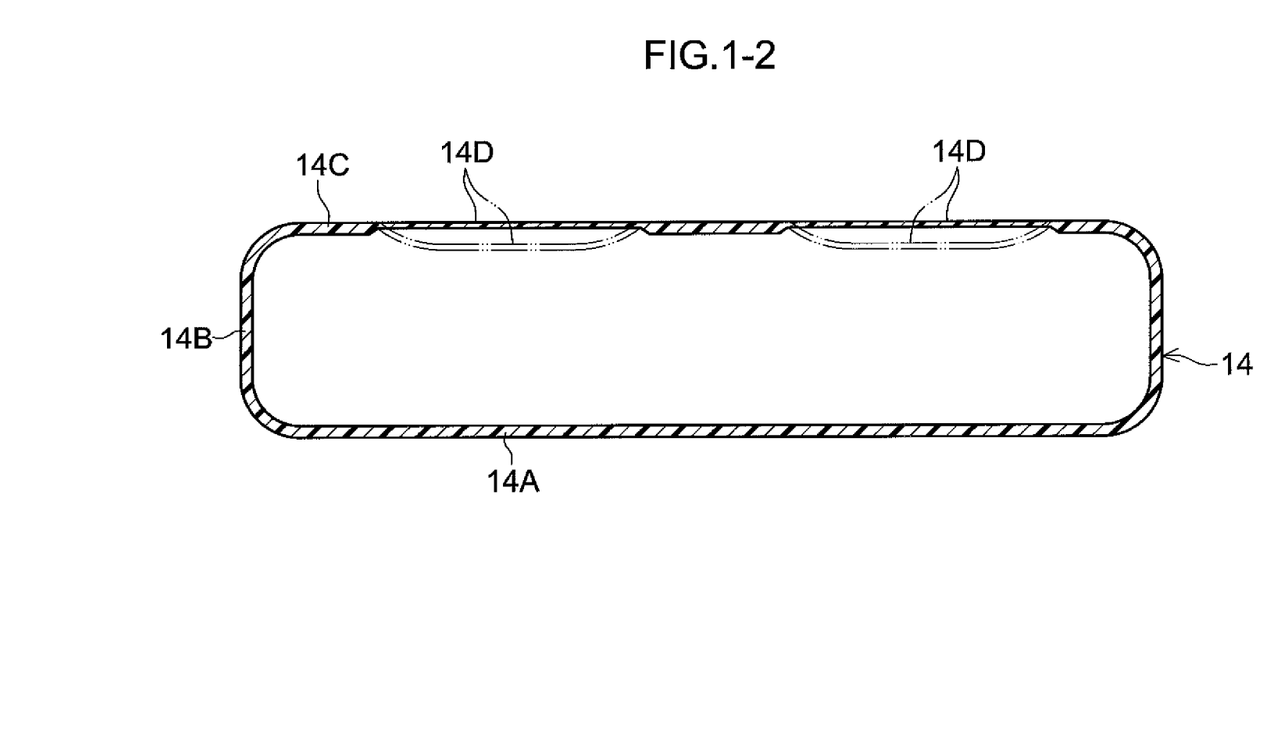
Figure 13:
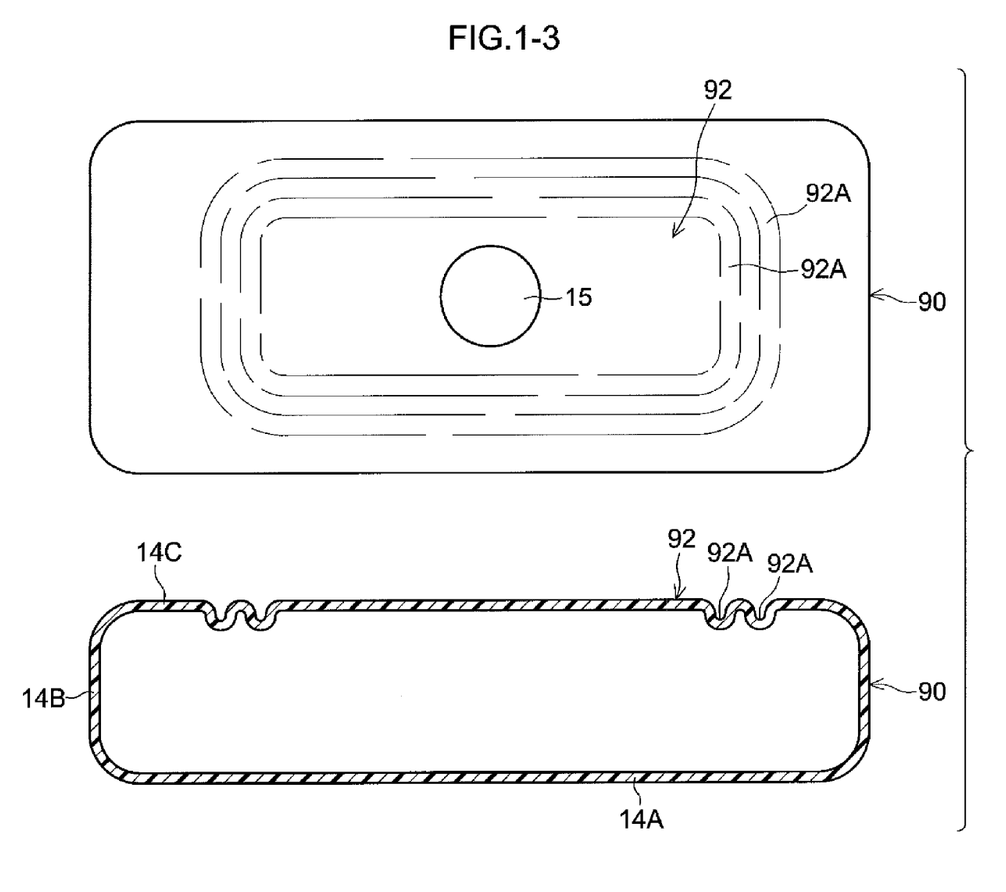

FIG. 1 illustrate a fuel tank system 12 of a first exemplary embodiment of the present invention. The fuel tank system 12 is installed to a vehicle and is used to supply fuel to an engine.

The fuel tank system 12 includes a fuel tank 14 in which fuel is stored. An upper portion of the fuel tank 14 is connected to a lower end of an inlet pipe 16. A refueling gun of a refueling apparatus, not shown in the drawings, is connected to a refueling opening 17 provided at an upper end of the inlet pipe 16, allowing refueling of the fuel tank 14. Fuel L inside the fuel tank 14 is driven by a fuel pump 40, supplying the fuel L to an engine 50 through a fuel supply pipe 28.

A detachable cap 17A is attached to the refueling opening 17. An open-and-closable lid 44 is provided at a position facing the cap 17A of the refueling opening 17, and opening and closing of the lid 44 is detected by a lid sensor 46. A flapper valve 32 is attached to the lower end of the inlet pipe 16. The flapper valve 32 is opened when fuel moves from the inlet pipe 16 to the fuel tank 14, permitting fuel movement, however the flapper valve 32 is closed when fuel moves in the opposite direction, preventing fuel movement in the opposite direction.

A canister 18 internally filled with activated carbon is provided above the fuel tank 14. The canister 18 is connected to the fuel tank 14 by a vapor pipe 34 (pipe). The canister 18 adsorbs vaporized fuel gas generated for example during refueling, which is then desorbed for example when the vehicle is travelling. An atmosphere release pipe 24 (pipe) is connected to an atmosphere side port 20 of the canister 18. A gas layer A at an upper portion inside the fuel tank 14 is in communication with the external atmosphere through the atmosphere release pipe 24 that is connected via the vapor pipe 34 and the canister 18.

A purge pipe 23 leading to the engine 50 is connected to a purge port 21 of the canister 18. Configuration is made so that the desorbed fuel vapor is conveyed to the engine 50 through the purge pipe 23 during purging of the canister 18. Moreover, one end of the atmosphere release pipe 24 is connected to the canister 18, and the other end of the atmosphere release pipe 24 is provided with a filter 22 for purifying introduced atmosphere (air). Namely, the other end of the atmosphere release pipe 24 is open to the atmosphere through the filter 22 in the vicinity of the upper end of the inlet pipe 16. Fuel vapor is adsorbed by an adsorption agent (the activated carbon) inside the canister 18 and gas is released into the atmosphere from the atmosphere release pipe 24 when gas containing fuel vapor inside the fuel tank 14 is introduced into the canister 18 through the vapor pipe 34. Moreover, during purging of the canister 18, atmospheric gas is introduced to the canister 18 through the atmosphere release pipe 24.

A full tank regulator valve 38 equipped with a float shaped valve body 38B is provided at a lower end of the vapor pipe 34. During refueling, even when the liquid surface LS of the fuel L has risen, the valve body 38B does not close off the vapor pipe 34 until the liquid surface LS reaches the full tank regulator valve 38, and so gas inside the fuel tank 14 moves into the canister 18 through the vapor pipe 34. The gas is released into the atmosphere through the atmosphere release pipe 24 after the fuel vapor has been adsorbed by the active carbon in the canister 18. Refueling is accordingly not impeded. However, the valve body 38B floats on the fuel when the liquid surface LS reaches the full tank regulator valve 38, closing off the vapor pipe 34 such that gas inside the fuel tank 14 can no longer move into the canister 18.

The fuel tank 14 and an upper portion of the inlet pipe 16 are connected together by a breather pipe 26. A lower end of the breather pipe 26 configures an opening portion 30, and is positioned at an upper portion (above the lower end of the inlet pipe 16) inside the fuel tank 14. The upper end of the breather pipe 26 opens into the upper portion of the inlet pipe 16.

After fuel inside the fuel tank 14 has been conveyed out by the fuel pump 40 through the fuel supply pipe 28 to a fuel injection valve 64, the fuel is injected into an air intake path 66 of the engine 50 by the fuel injection valve 64. A slot valve 68 that opens and closes the air intake path 66, and an air cleaner 70 disposed at an air introduction side of the air intake path 66, are provided at the air intake path 66.

As shown in FIG. 1-1 and FIG. 1-2, the fuel tank 14 is configured by a hollow shaped container, and is provided with a bottom wall portion 14A configuring a bottom face, a side wall portion 14B that is formed around the periphery of the bottom wall portion 14A, and an upper wall portion 14C that covers a top portion of the side wall portion 14B. The upper wall portion 14C (wall portion) is provided with a deformation location 14D that is formed thinner than the thickness of a general portion of the upper wall portion 14C, and is configured so as to be capable of indentation-deformation towards the inside of the fuel tank 14 (inwards). In plan view, the deformation location 14D is provided in a ring shape at the periphery of an attachment portion 15 of the vapor pipe 34 and the like provided at a central portion of the upper wall portion 14C of the fuel tank 14. The deformation location 14D is configured so as to indent, from a position on an extension line of the upper wall portion 14C as viewed in cross-section, in a curved shape towards the lower side of the upper wall portion 14C due to reducing the pressure inside the fuel tank 14 using a negative pressure pump 58, described later.

A floor face 80 configuring a portion of a vehicle body is disposed above the fuel tank 14 in a substantially horizontal direction along the upper wall portion 14C. In the present exemplary embodiment, since the deformation location 14D of the fuel tank 14 indentation-deforms towards the inside of the fuel tank 14, there is accordingly no need to secure a deformation region for the deformation location 14D between the upper wall portion 14C and the floor face 80. A narrow separation can accordingly be set between the upper wall portion 14C and the floor face 80.

As shown in FIG. 1-1, a pressure sensor 74 for detecting the pressure (internal pressure) inside the fuel tank 14 is provided at the upper portion of the fuel tank 14. An electromagnetic valve 52 serving as an open-and-closable valve that opens and blocks off the vapor pipe 34 is attached at an intermediate portion of the vapor pipe 34. The electromagnetic valve 52 is opened and closed by an electronic control unit (ECU) 60 serving as a control unit. Opening the electromagnetic valve 52 places the gas layer A at the upper portion of the fuel tank 14 in communication with the canister 18 through the vapor pipe 34.

The negative pressure pump 58 is provided at one end side of the atmosphere release pipe 24 (at a position close to the canister 18). The negative pressure pump 58 serves as a deformation unit that causes the deformation location 14D to indentation-deform towards the inside (inwards) by reducing the pressure inside the fuel tank 14 by suctioning gas from the gas layer A at the upper portion inside the fuel tank 14. Actuation of the negative pressure pump 58 is controlled by the ECU 60 that serves as a control section. Namely, in an open state of the electromagnetic valve 52, the negative pressure pump 58 is actuated (and the purge pipe 23 is blocked off) and the pressure inside the fuel tank 14 is reduced (negative pressure is created inside the fuel tank 14), causing the deformation location 14D to indentation-deform towards the inside of the fuel tank 14, and thereby reducing the number of air molecules in the gas layer A at the upper portion of the fuel tank 14.

Configuration is made such that the ECU 60 then closes the electromagnetic valve 52, thereby sealing the fuel tank 14 in an indented state of the deformation location 14D towards the inside of the fuel tank 14. The electromagnetic valve 52 is opened during refueling, and after the gas layer A at the upper portion of the fuel tank 14 has been placed in communication with the external atmosphere, for example after refueling, control is then made to close the electromagnetic valve 52 in a state in which the deformation location 14D has been indented towards the inside of the fuel tank 14 by actuating the negative pressure pump 58. In the present exemplary embodiment; the ECU 60 performs control to open the electromagnetic valve 52 when the lid 44 is detected as being open by the lid sensor 46. Moreover, the ECU 60 performs control to close the electromagnetic valve 52 when the negative pressure pump 58 is actuated and the pressure detected by the pressure sensor 74 is a stipulated value or lower.

The deformation location 14D that is indented towards the inside of the fuel tank 14 is configured so as to bulge up to a permissible range corresponding to increase in pressure when the pressure (internal pressure) inside the fuel tank 14 increases to a specific value or greater due for example to a rise in temperature in a sealed state of the fuel tank 14. In other words, as viewed in cross-section, the deformation location 14D is configured so as to gradually return according to the increase in pressure, from the state indented towards the inside of the fuel tank 14 towards its original position on an extension line of the upper wall portion 14C. When this occurs, configuration may be made such that the deformation location 14D bulges up to a permissible range that is above the position on the extension line of the upper wall portion 14C of the fuel tank 14.

Moreover, a bypass path 54 is provided at the vapor pipe 34 to connect together an upstream side and a downstream side of the electromagnetic valve 52, in parallel to the location at which the electromagnetic valve 52 is provided. A mechanical relief valve 56 that has a relief function is attached to the bypass path 54. Configuration is made such that the relief valve 56 is normally closed, however the relief valve 56 is opened by the pressure difference when the pressure inside the fuel tank 14 in a sealed state has increased by a specific pressure or greater in comparison to the pressure on the canister 18 side. Actuation of an electric lid opener 62 is moreover controlled by the ECU 60 to release a locked state of the lid 44. The lid opener 62 is configured so as to be actuated when a lid switch, not shown in the drawings, is pressed.

Explanation follows regarding operation of the fuel tank system 12 of the present exemplary embodiment.

Figure 2:
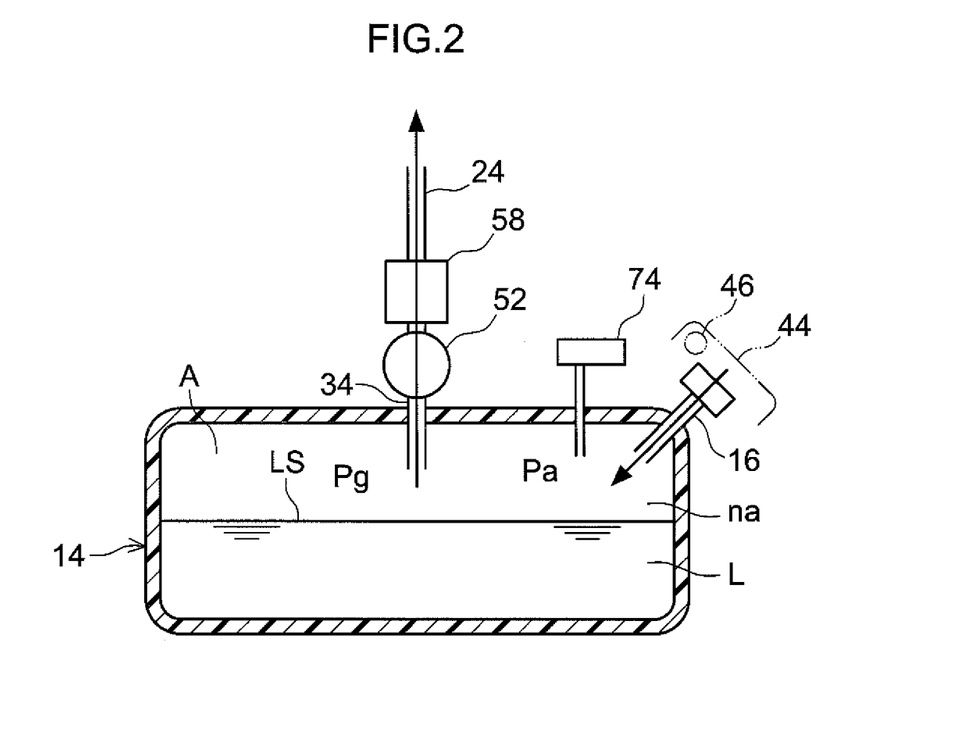
FIG. 2 is a partial configuration diagram illustrating a fuel tank system of the first exemplary embodiment of the present invention in an actuated state during refueling.

FIG. 2 to FIG. 6 schematically illustrate an actuation process of the fuel tank system 12. FIG. 2 illustrates an actuated state of the fuel tank system 12 during refueling. During refueling, the lid 44 and the cap 17A (see FIG. 1) are open, and the electromagnetic valve 52 is open. The ECU 60 opens the electromagnetic valve 52 when opening of the lid 44 has been detected by the lid sensor 46. Opening the electromagnetic valve 52 places the fuel tank 14 in communication with the external atmosphere through members including the vapor pipe 34 and the atmosphere release pipe 24, such that the pressure inside the fuel tank 14 becomes substantially the same as the atmospheric pressure.

In this state, fuel is refueled through the inlet pipe 16 from a refueling gun, not shown in the drawings, and the liquid surface LS of the fuel L inside the fuel tank 14 rises. Since the electromagnetic valve 52 is open, gas (air and fuel vapor) in the gas layer A at the upper portion inside the fuel tank 14 moves towards the canister 18 (see FIG. 1) through the vapor pipe 34, and refueling of the fuel is not impeded. At this point, the negative pressure pump 58 is not actuated. At refueling completion the number of air molecules in the gas layer A inside the fuel tank 14 is na.

Figure 3:
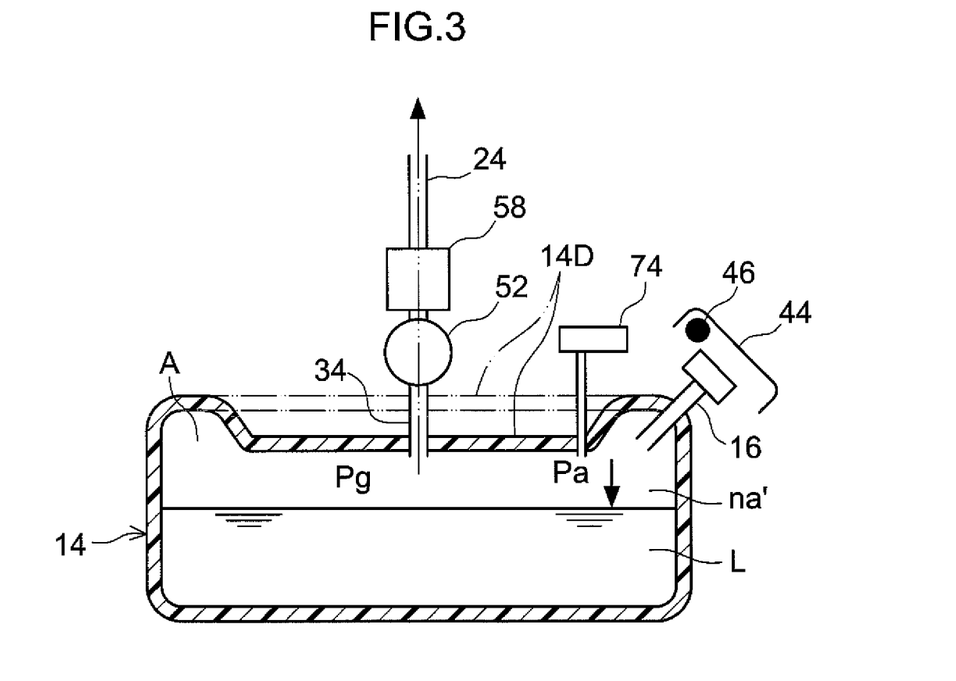
FIG. 3 is a partial configuration diagram illustrating a fuel tank system of the first exemplary embodiment of the present invention in an actuated state of a negative pressure pump after refueling completion.

FIG. 3 illustrates an actuated state of the fuel tank system 12 after refueling completion. The cap 17A is closed, and the lid 44 is closed when refueling has been completed. The ECU 60 drives the negative pressure pump 58 (negative pressure pump 58 actuated state) when closing of the lid 44 has been detected by the lid sensor 46 (when an ON state of the lid sensor 46 has been detected). The electromagnetic valve 52 is open when this occurs. Accordingly, gas in the gas layer A at the upper portion inside the fuel tank 14 is sucked into the canister 18 through the vapor pipe 34, and air is externally expelled from the atmosphere release pipe 24 through the filter 22, thereby reducing the pressure inside the fuel tank 14 (see FIG. 1). The deformation location 14D of the fuel tank 14 indentation-deforms towards the inside (inwards) when the pressure inside the fuel tank 14 has been reduced to a specific pressure, and the volume of the fuel tank 14 decreases. The number of air molecules in the gas layer A at the upper portion of the fuel tank 14 is therefore reduced (the number of air molecules na in FIG. 1 is reduced to the number of air molecules na' in FIG. 2).

Figure 4:
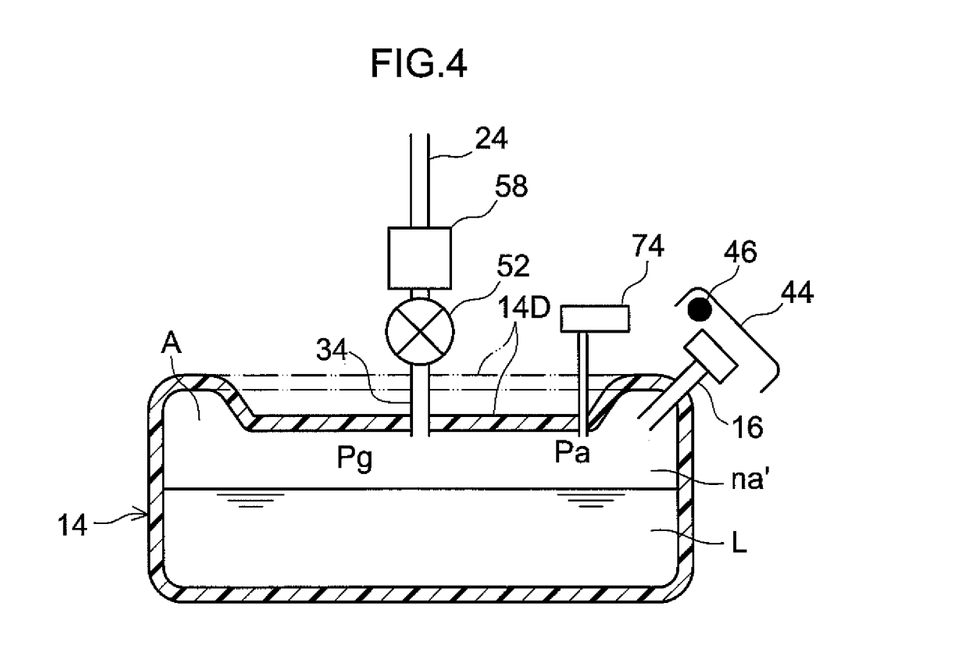
FIG. 4 is a partial configuration diagram illustrating a fuel tank system of the first exemplary embodiment of the present invention in a stopped state of a negative pressure pump after refueling completion.

FIG. 4 illustrates an actuated state of the fuel tank system 12 during pressure reduction after refueling completion. The ECU 60 closes the electromagnetic valve 52, and stops driving the negative pressure pump 58 (a negative pressure pump stopped state) when the pressure is reduced after refueling completion and the pressure inside the fuel tank 14 is detected by the pressure sensor 74 to have become a stipulated value or lower. Accordingly, the fuel tank 14 is sealed with the deformation location 14D of the fuel tank 14 in an indentation-deformed state towards the inside. In the present exemplary embodiment, control is made to stop driving the negative pressure pump 58 after the electromagnetic valve 52 has been closed and a valve closed signal of the electromagnetic valve 52 has been ascertained by the ECU 60. Pressure reduction inside the fuel tank 14 can accordingly be reliably performed. In this state, the deformation location 14D of the fuel tank 14 is indentation-deformed towards the inside, and the number of air molecules na' in the gas layer A at the upper portion of the fuel tank 14 is small.

Figure 5:
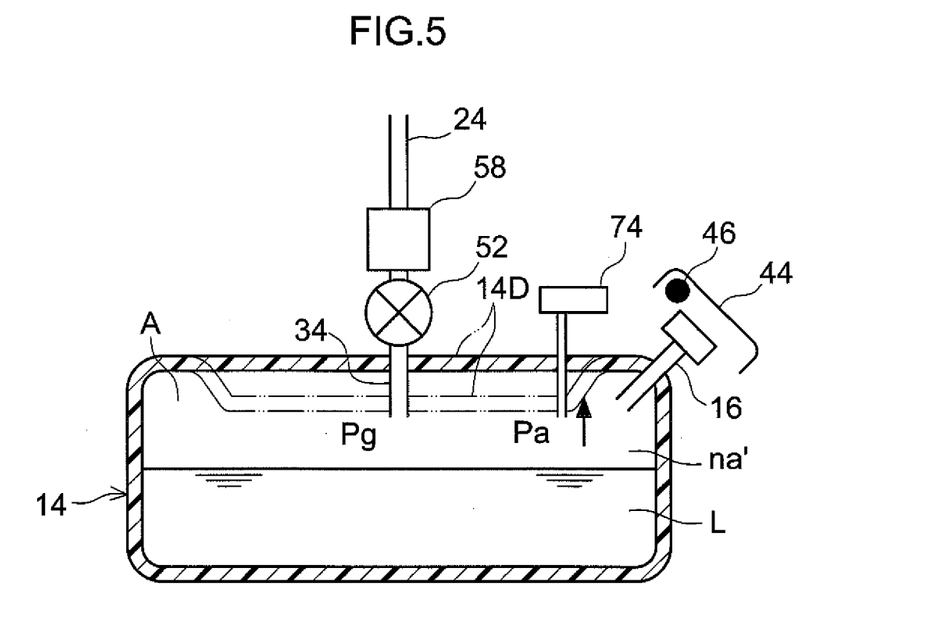
FIG. 5 is a partial configuration diagram illustrating a fuel tank system of the first exemplary embodiment of the present invention in a state in which the temperature has risen during travel or when parked.

FIG. 5 illustrates an actuated state of the fuel tank system 12 when the temperature has risen during vehicle travel or when the vehicle is parked (a high temperature state). During vehicle travel or when the vehicle is parked, the electromagnetic valve 52 is closed, the fuel tank 14 is sealed, and the negative pressure pump 58 is stopped. When the temperature rises in this state, the deformation location 14D of the fuel tank 14 gradually returns according to the increase in pressure inside the fuel tank 14 towards its original position substantially on an extension line of the upper wall portion 14C as viewed in cross-section, and the volume of the fuel tank 14 increases (the volume of the fuel tank 14 is restored). When this occurs, since the number of air molecules na' in the gas layer A at the upper portion of the fuel tank 14 is small, the pressure inside the fuel tank 14 increases less readily than in a configuration in which the volume of a fuel tank is not decreased (a configuration in which the number of air molecules is not reduced). The reason for this is explained in detail later. Note that during vehicle travel, the temperature readily rises due receiving heat from the engine 50 and exhaust gases. The deformation location 14D may also be configured so as to bulge up to a permissible range above the position substantially on the extension line of the upper wall portion 14C of the fuel tank 14. Bulging of the deformation location 14D is kept within the permissible range by regulating the valve opening pressure of the relief valve 56.

Figure 6:
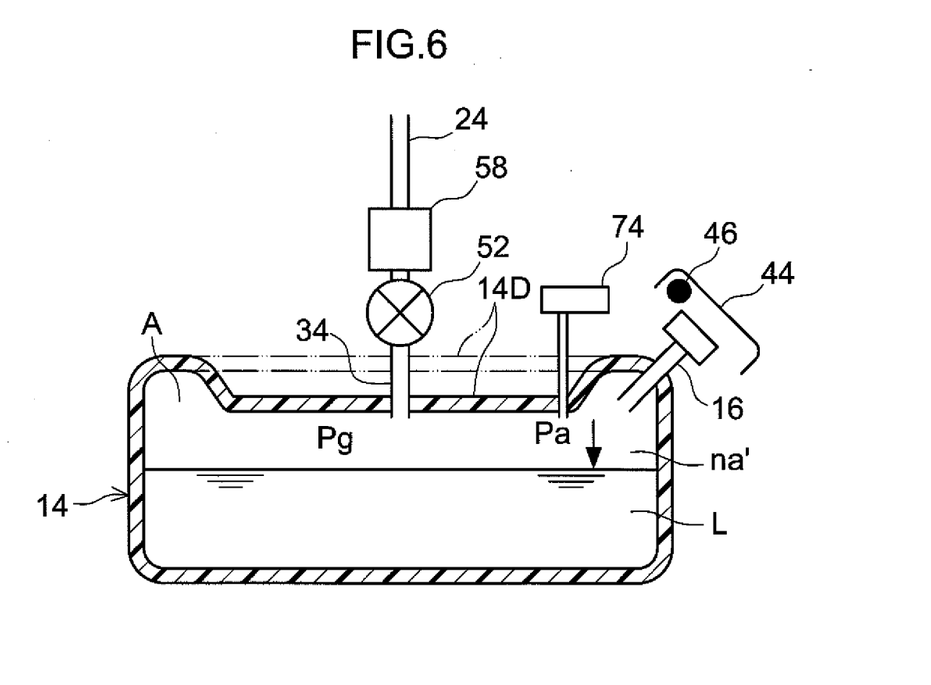
FIG. 6 is a partial configuration diagram illustrating a fuel tank system of the first exemplary embodiment of the present invention in a state in which the temperature has fallen during travel or when parked.

FIG. 6 illustrates an actuated state of the fuel tank system 12 when the temperature has fallen during vehicle travel or when the vehicle is parked (a low temperature state). During vehicle travel or when the vehicle is parked, the electromagnetic valve 52 is closed, the fuel tank 14 is sealed, and the negative pressure pump 58 is stopped. When the temperature falls in this state, the deformation location 14D of the fuel tank 14 indentation-deforms towards the inside (inwards) according to the reduction in pressure inside the fuel tank 14, and the volume of the fuel tank 14 decreases.

The negative pressure inside the fuel tank 14 is small since the pressure is alleviated by the decrease in volume of the fuel tank 14. In the present exemplary embodiment, the state illustrated in FIG. 5 in which the deformation location 14D has not indentation-deformed and the state illustrated in FIG. 6 in which the deformation location 14D has indentation-deformed are repeated according to the pressure inside the fuel tank 14.

Detailed explanation of the operation of the present exemplary embodiment follows. A pressure P of the gas layer A inside the fuel tank 14 is the sum of a partial pressure Pg of the fuel vapor and a partial pressure Pa of the air.

$$P=Pg+Pa$$

The partial pressure Pa of the air is expressed by the gas equation of state shown in Equation 1 . In Equation 1 , V is the volume occupied by the gas, n is the gas quantity (number of moles), R is the gas constant, and T is the thermodynamic temperature of the gas. The partial pressure Pg of the fuel vapor becomes the saturated vapor pressure.

$$P_a = \frac{n \cdot R \cdot T}{V} \qquad \text{Equation 1}$$

As shown in FIG. 5, when the deformation location 14D of the fuel tank 14 has returned to a non-indentation-deformed state when the temperature rises, pressure tends to drop due to n in Equation 1 being small (the number of air molecules na' being small) and V increasing, so as to give a downwards trend in pressure. The pressure inside the fuel tank 14 accordingly increases less readily than in a configuration in which fuel tank volume is not decreased (a configuration in which the number of air molecules is not reduced).

Moreover, as shown in FIG. 6, as the temperature falls, the negative pressure inside the fuel tank 14 is small since pressure is alleviated by the decrease in volume of the fuel tank 14. Pressure fluctuation in the fuel tank 14 is accordingly reduced, with this being advantageous from the perspective of the pressure capacity of the fuel tank 14. The need to unnecessarily further strengthen the fuel tank 14 is accordingly obviated.

Note that the fuel tank system 12 is placed in the state illustrated in FIG. 2 when refueling, and the processes above are repeated in sequence.

Figure 7:
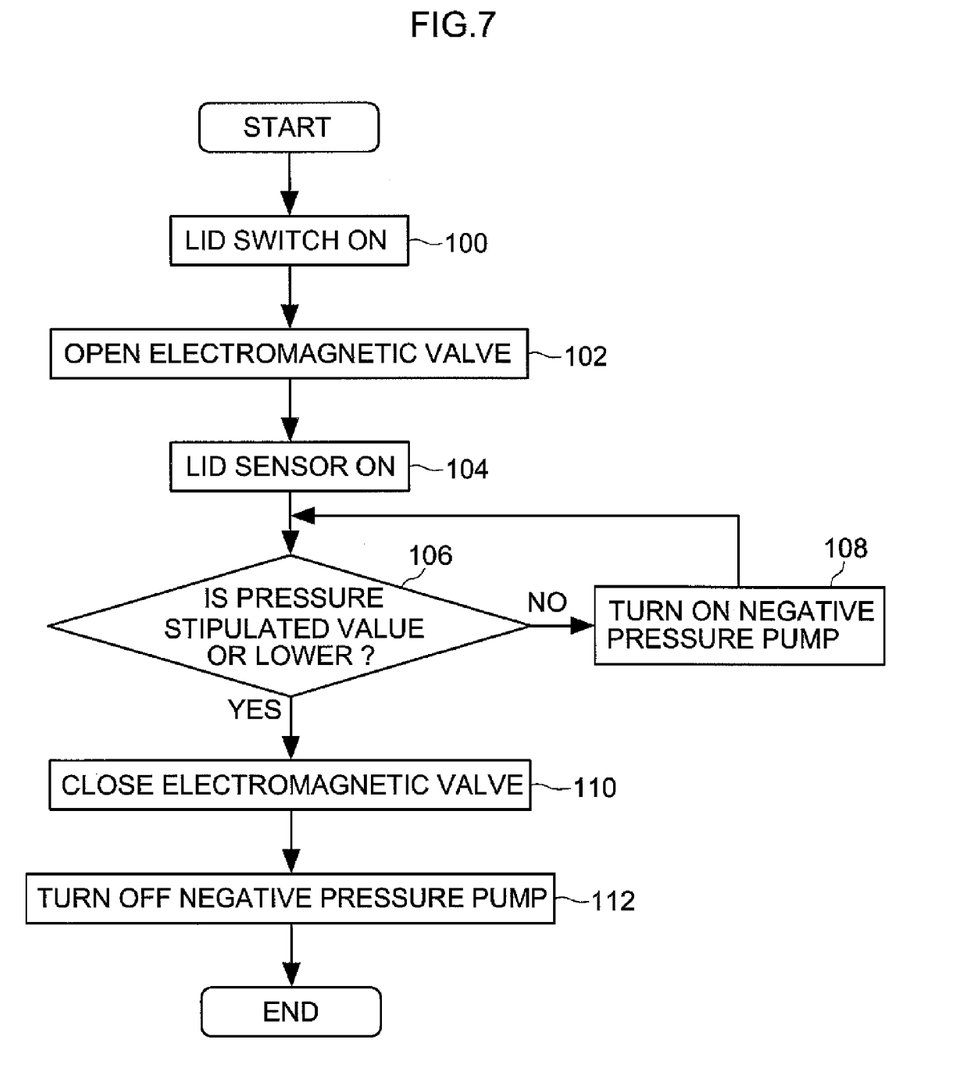
FIG. 7 is a flowchart illustrating an actuation process of a fuel tank system of the first exemplary embodiment of the present invention.

FIG. 7 is a flow chart illustrating a process flow of actuation of the fuel tank system 12 in the ECU 60.

As shown in FIG. 7, when an ON state signal of the lid switch is input at step 100, the electromagnetic valve 52 is opened at step 102. The fuel tank 14 is refueled in this state. An ON signal of the lid sensor 46 is input at step 104 when the lid 44 has been closed after refueling completion. The pressure inside the fuel tank 14 is also measured by the pressure sensor 74 after refueling completion.

Next, determination is made at step 106 as to whether or not the pressure inside the fuel tank 14 is at the stipulated value or lower. When the pressure inside the fuel tank 14 is above the stipulated value, the negative pressure pump 58 is driven (put into an ON state) at step 108. Gas in the gas layer A at the upper portion inside the fuel tank 14 is accordingly sucked out, reducing the pressure inside the fuel tank 14. Driving of the negative pressure pump 58 is continued until the pressure inside the fuel tank 14 reaches the stipulated value or lower at step 106.

When the pressure inside the fuel tank 14 is determined to be at the stipulated value or lower at step 106, the electromagnetic valve 52 is then closed at step 110. In the present exemplary embodiment, regulation is made such that the deformation location 14D of the fuel tank 14 achieves an indentation-deformed state towards the inside when the pressure inside the fuel tank 14 has reached the stipulated value or lower, and the volume of the fuel tank 14 is decreased. In this state, the fuel tank 14 is sealed by closing the electromagnetic valve 52.

Next, driving of the negative pressure pump 58 is stopped (put into an OFF state) at step 112. Driving the negative pressure pump 58 is stopped after a signal has been ascertained indicating that the electromagnetic valve 52 is closed.

In the thus configured fuel tank system 12, after the fuel tank 14 has been placed in communication with the external atmosphere by opening the electromagnetic valve 52, the negative pressure pump 58 is driven under specific conditions to cause the deformation location 14D of the fuel tank 14 to indentation-deform towards the inside, and enabling the volume of the fuel tank 14 to be decreased. Moreover, the negative pressure pump 58 can be driven efficiently due to driving the negative pressure pump 58 when the pressure inside the fuel tank 14 is higher than the stipulated value. The pressure inside the fuel tank 14 can be reliably reduced due to stopping driving the negative pressure pump 58 after ascertaining the signal indicating that the electromagnetic valve 52 is closed.

FIG. 9 to FIG. 14 schematically illustrate an actuation process of a fuel tank system 200 according to a comparative example.

Figure 9:
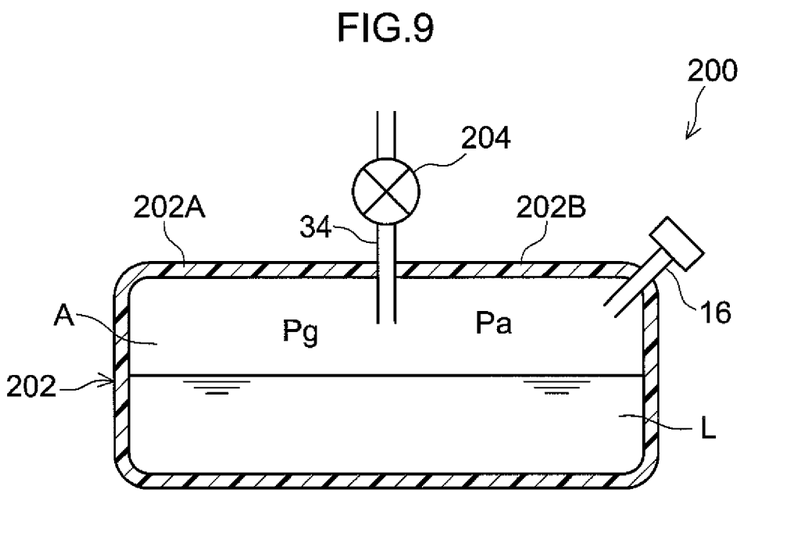
FIG. 9 is a partial configuration diagram illustrating a fuel tank system of a comparative example in an actuated state when refueling is completed.

In the fuel tank system 200, a bulge-deformation location 202B capable of bulge-deforming towards the upper side through resilient deformation is provided at an upper wall portion 202A of a fuel tank 202. An electromagnetic valve 204 is provided at a vapor pipe 34 that is connected to the fuel tank 202, however the negative pressure pump 58 of the first exemplary embodiment is not provided.

Figure 10:
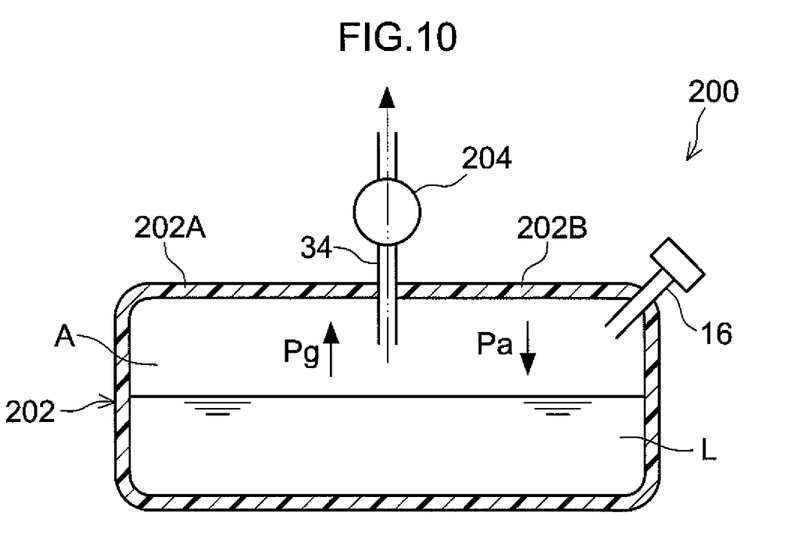
FIG. 10 is a partial configuration diagram illustrating a fuel tank system of the comparative example in a state in which the temperature has risen during travel.

As shown in FIG. 9, when refueling is completed, the electromagnetic valve 204 is closed, and the fuel tank 202 is sealed. In this state, the pressure inside the fuel tank 202 becomes substantially the same as the atmospheric pressure. As shown in FIG. 10, the electromagnetic valve 204 is opened during vehicle travel, and gas such as fuel vapor in a gas layer A at an upper portion of the fuel tank 202 moves towards a canister 18 through the vapor pipe 34 when the temperature rises in this state. When this occurs, the pressure inside the fuel tank 202, which is a positive pressure, is changed to a lower pressure state by performing positive pressure relief with a regulation valve.

As shown in FIG. 11, the electromagnetic valve 204 is closed when the vehicle stops travelling. When the temperature falls in this state, a partial pressure Pg of the fuel vapor and a partial pressure Pa of the air in the gas layer A at the upper portion of the fuel tank 202 decrease, and the pressure P decreases. When this occurs, the number of air molecules in the gas layer A at the upper portion of the fuel tank 202 becomes na.

As shown in FIG. 12, when the temperature falls further when travel has stopped, air is sucked into the fuel tank 202 through the vapor pipe 34 from the canister 18 side by negative pressure relief when the pressure of the fuel tank 202 reaches a specific value or lower (when a large negative pressure is reached). The number of air molecules na' accordingly increases, and the partial pressure Pa of the air increases.

As shown in FIG. 13, since the electromagnetic valve 204 is closed when the temperature rises whilst parked, the partial pressure Pg of the fuel vapor and the partial pressure Pa of the air in the gas layer A at the upper portion of the fuel tank 202 accordingly increase, and the pressure P increases.

Figure 14:
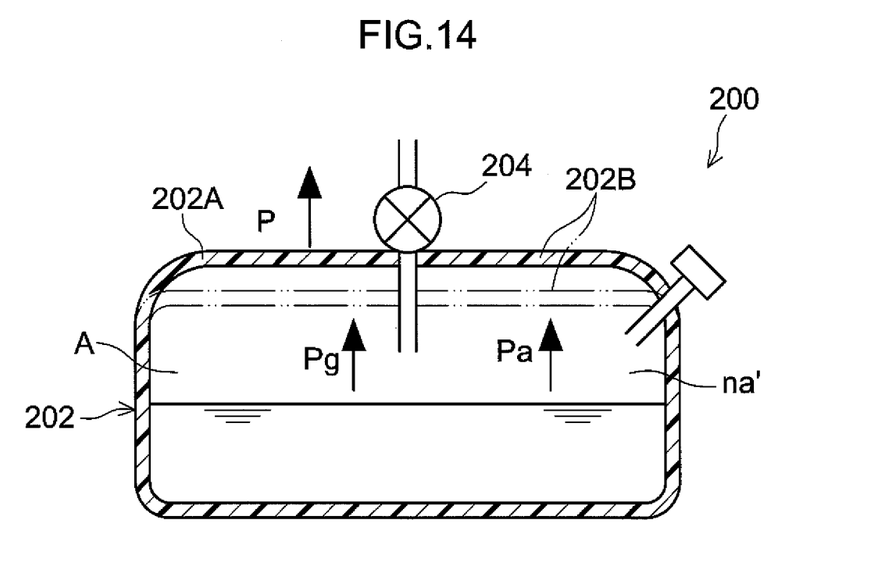
FIG. 14 is a partial configuration diagram illustrating a fuel tank system of the comparative example in a state in which the temperature has risen and a fuel tank has deformed so as to bulge out outwards when parked.

As shown in FIG. 14, when the temperature rises whilst parked and the pressure inside the fuel tank 202 increases to the specific value or above, the bulge-deformation location 202B of the upper wall portion 202A of the fuel tank 202 bulges out towards the upper side due to resilient deformation, increasing the volume of the fuel tank 202. Namely, the volume of the fuel tank 202 increases when the pressure inside the fuel tank 202 increases due to the rise in temperature, thereby tending to suppress the pressure according to Equation 1 . However, pressure tends to increase by the amount of increase in the number of air molecules na' in FIG. 12. Accordingly, in the fuel tank system 200 of the comparative example, the partial pressure Pa of the air readily increases due to the increase in the number of air molecules na', and the pressure inside the fuel tank 202 increases. It is accordingly necessary to strengthen the fuel tank 202 itself. It is also necessary to secure a space for the bulge-deformation towards the upper side of the bulge-deformation location 202B, between the upper wall portion 202A of the fuel tank 202 and a floor face 80 (see FIG. 1) above the bulge-deformation location 202B, thereby limiting the degrees of freedom for design.

In contrast thereto, in the fuel tank system 12 of the present exemplary embodiment, the deformation location 14D of the fuel tank 14 is indentation-deformed towards the inside (inwards), and so even when the temperature rises after sealing the fuel tank 14, by reducing the number of air molecules na' in the gas layer A, the pressure inside the fuel tank 14 increases less readily by an amount related to the reduced number of air molecules na'. The need to unnecessarily further strengthen the fuel tank 14 is accordingly obviated. Since the deformation location 14D of the fuel tank 14 does not bulge outwards from the fuel tank 14, there is no need to secure a space for deformation between the upper wall portion 14C of the fuel tank 14 and the floor face 80, enabling an economical use of space.

FIG. 1-3 illustrates a modified example of a fuel tank according to the first exemplary embodiment. In such a fuel tank 90, a deformation location 92 is provided at the periphery of the attachment portion 15 at the central portion of the upper wall portion 14C. Two ring shaped beads 92A projecting towards the inside of the fuel tank 90 are provided at edge portions of the deformation location 92. The beads 92A extend inwards into the fuel tank 90 and the deformation location 92 indentation-deforms towards the inside due to a reduction in pressure inside the fuel tank 90 caused by driving the negative pressure pump 58 (see FIG. 1). In the thus configured fuel tank 90, the deformation location 92 can be made to indentation-deform towards the inside with a simple configuration.

Figure 8:
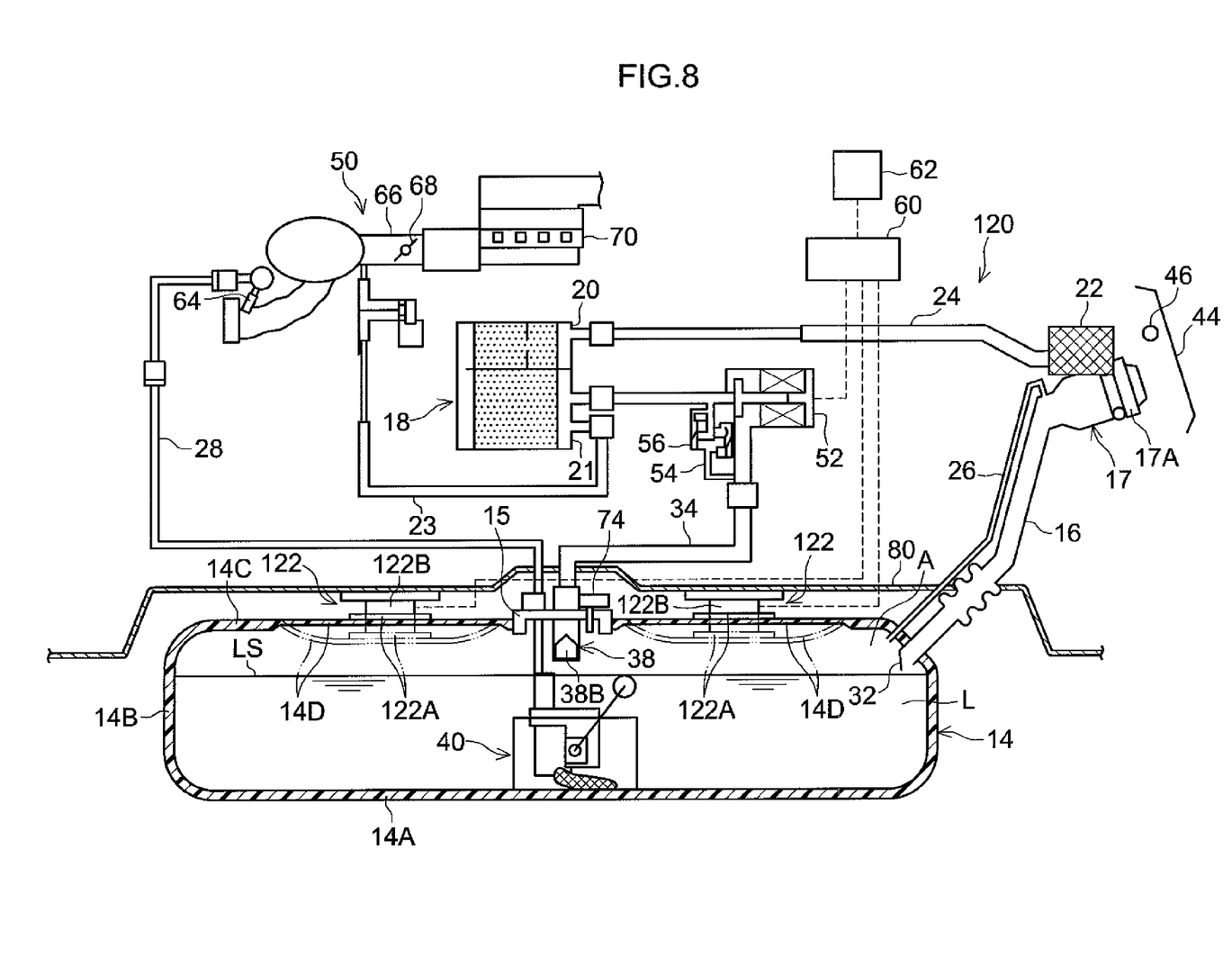
FIG. 8 is a schematic configuration diagram illustrating a fuel tank system of a second exemplary embodiment of the present invention.

FIG. 8 illustrates a fuel tank system 120 of a second exemplary embodiment of the present invention. Configuration elements and members of the second exemplary embodiment similar to the first exemplary embodiment are allocated the same reference numerals, and detailed explanation thereof is omitted.

In the fuel tank system 120 of the second exemplary embodiment, actuators 122 serving as pressing units are provided at an upper portion of a fuel tank 14, in place of the negative pressure pump 58 of the fuel tank system 12 of the first exemplary embodiment. The actuators 122 are configured by a solenoid, and include a pressing portion 122A disposed so as to contact an upper face of a deformation location 14D of the fuel tank 14, and a rod 122B that extends and retracts the pressing portion 122A with respect to the fuel tank 14 side. The actuators 122 are attached to a lower portion of a floor face 80 by fixings, not shown in the drawings. Actuation of the actuators 122 is controlled by an ECU 60.

In the fuel tank system 120, in an open state of an electromagnetic valve 52, the rods 122B of the actuators 122 are extended towards the fuel tank 14 side, and the deformation location 14D of the fuel tank 14 is pressed towards the bottom side by the pressing portions 122A. Gas in a gas layer A at an upper portion of the fuel tank 14 is accordingly externally expelled through a vapor pipe 34 and an atmosphere release pipe 24, and the deformation location 14D of the fuel tank 14 indentation-deforms towards the inside (inwards). The volume of the fuel tank 14 thereby decreases, reducing the number of air molecules in the gas layer A at the upper portion of the fuel tank 14. In this state, the fuel tank 14 is sealed by closing the electromagnetic valve 52.

In the thus configured fuel tank system 120, the deformation location 14D of the fuel tank 14 is indentation-deformed towards the inside, and the number of air molecules na' in the gas layer A is reduced. Accordingly, even when the temperature rises after the fuel tank 14 has been sealed, the pressure inside the fuel tank 14 increases less readily by an amount related to the reduced number of air molecules na'. The need to unnecessarily further strengthen the fuel tank 14 is accordingly obviated. There is also no need to provide the actuators 122 to the entire face of the deformation location 14D of the fuel tank 14 provided that a portion of the deformation location 14D can be contacted by the actuators 122, thereby obviating the need to provide a large space between an upper wall portion 14C of the fuel tank 14 and the floor face 80.

Note that in the present exemplary embodiment, the actuators 122 are provided at both sides of an attachment portion 15 of the fuel tank 14. However, the actuators 122 may be provided at any position between the upper wall portion 14C of the fuel tank 14 and the floor face 80 provided that it is a position at which the pressing portions 122A contact the deformation location 14D of the fuel tank 14.

Note that although in the first exemplary embodiment and in the modified example thereof, the deformation location 14D, 92 is provided at the upper wall portion 14C of the fuel tank 14, 90, there is no limitation thereto, and a deformation location may for example be provided at another position such as the side wall portion 14B or the bottom wall portion 14A of the fuel tank 14, 90. There is also no limitation to the shape of the deformation location 14D, 92, and configuration may be made with a different shape, for example an accordion shape, provided that configuration is such that the deformation location indentation-deforms towards the fuel tank inside. A deformation location may also be formed by a separate member such as a resilient body.

In the second exemplary embodiment, the deformation location 14D is provided at the upper wall portion 14C of the fuel tank 14, and the actuators 122 are provided above the deformation location 14D, however there is no limitation thereto. For example, configuration may be made with a deformation location provided at a side wall portion 14B of the fuel tank 14, and the actuators 122 provided at the side of the deformation location.

The second exemplary embodiment is provided with the actuators 122, however there is no limitation thereto, and a pressing unit configured by for example a spring may be provided.

EXPLANATION OF THE REFERENCE NUMERALS 12 fuel tank system
14 fuel tank
14C upper wall portion (wall portion)
14D deformation location
24 atmosphere release pipe (pipe)
34 vapor pipe (pipe)
52 electromagnetic valve (valve)
58 negative pressure pump
60 ECU (control unit)
90 fuel tank
92 deformation location
92A bead
120 fuel tank system
122 actuator (pressing unit)
A gas layer
L fuel

The invention claimed is:

1. A fuel tank system comprising:
a fuel tank capable of storing fuel that is supplied to an engine;
a pipe that communicates a gas layer at an upper portion inside the fuel tank with an external atmosphere;
a deformation location that is provided at a portion of an upper wall portion of the fuel tank so as to be provided at a periphery of a fuel pump provided at a central portion inside the fuel tank in plan view, the deformation location being formed thinner than a thickness of another location of the upper wall portion and being deformable so as to indent towards an inside of the fuel tank;
a deformation unit that deforms the deformation location such that the deformation location indents towards the inside of the fuel tank;
a valve that is provided at the pipe, that opens the pipe to communicate the gas layer with the external atmosphere, and that closes off the pipe to seal the fuel tank; and
a control unit that actuates the deformation unit with the valve in an open state after the gas layer has been communicated with the external atmosphere, and that closes the valve in a state in which the deformation location is indented towards the inside of the fuel tank,
wherein the deformation unit is a negative pressure pump that lowers pressure inside the fuel tank by suctioning from the gas layer and is set so as to drive the negative pressure pump immediately after a lid has been closed after refueling, and
wherein a configuration is effected such that the deformation location returns to its original position on an extension line of the upper wall portion according to an increase in pressure when the pressure inside the fuel tank increases to a specific value or greater from a state in which the deformation location is indented towards the inside of the fuel tank.

2. The fuel tank system of claim 1, further comprising a pressure sensor that detects the pressure inside the fuel tank, wherein
the control unit actuates the deformation unit when the pressure detected by the pressure sensor is higher than a stipulated value.

3. The fuel tank system of claim 2, wherein the control unit closes the valve when the pressure detected by the pressure sensor reaches the stipulated value or lower, and then ceases actuation of the deformation unit after the valve has been closed.

* * * * *